US007131115B2

(12) United States Patent
Hundt et al.

(10) Patent No.: US 7,131,115 B2
(45) Date of Patent: Oct. 31, 2006

(54) UNWINDING INSTRUMENTED PROGRAM CODE

(75) Inventors: Robert Hundt, Santa Clara, CA (US); Vinodha Ramasamy, Campbell, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 636 days.

(21) Appl. No.: 10/105,765

(22) Filed: Mar. 25, 2002

(65) Prior Publication Data

US 2003/0182655 A1 Sep. 25, 2003

(51) Int. Cl.
G06F 9/44 (2006.01)
(52) U.S. Cl. .................. 717/130; 717/128; 717/129
(58) Field of Classification Search ........ 717/127–130, 717/133; 714/1, 25, 45, 34
See application file for complete search history.

(56) References Cited

U.S. PATENT DOCUMENTS

| | | | | |
|---|---|---|---|---|
| 6,282,701 | B1 * | 8/2001 | Wygodny et al. | 717/125 |
| 6,470,493 | B1 * | 10/2002 | Smith et al. | 717/130 |
| 6,598,012 | B1 * | 7/2003 | Berry et al. | 702/187 |
| 6,662,358 | B1 * | 12/2003 | Berry et al. | 717/128 |
| 6,760,903 | B1 * | 7/2004 | Morshed et al. | 717/130 |
| 2003/0101380 | A1 * | 5/2003 | Chaiken et al. | 714/38 |

* cited by examiner

Primary Examiner—Tuan Dam
Assistant Examiner—Michael Yigdall

(57) ABSTRACT

Method and apparatus for handling call stack unwinding when execution of an instrumented program is stopped in a first function of the instrumented program. When unwinding is initiated and a call to a second function of unwind software is made, the call to the second function is intercepted. The second function returns a reference to unwind information associated with the first function of the instrumented program. The unwind information includes references to locations of selected instructions in the function. If the first function of the instrumented program is instrumented with instrumentation code, then updated unwind information is created. The updated unwind information includes updated references to the locations of the selected instructions in the first function as offset by the instrumentation code. A reference to the updated unwind information is returned.

6 Claims, 2 Drawing Sheets

UNWINDING INSTRUMENTED PROGRAM CODE

FIELD OF THE INVENTION

The present invention generally relates to instrumentation of computer program code, and more particularly to call-graph traversal, which is also known as stack unwinding, in an instrumented program.

BACKGROUND

Analysis of binary executable programs is performed to analyze program performance, verify correctness, and optimization, for example. Some analyses are performed prior to runtime (static analysis), while other analyses are performed during runtime (dynamic analysis). For both static and dynamic analysis, however, the analysis is often performed at the function level.

The term, "function", refers to named sections of code that are callable in the source program and encompasses routines, procedures, methods and other similar constructs known to those skilled in the art. The functions in the source code are compiled into segments of executable code. For convenience, the segments of executable code that correspond to the functions in the source code are also referred to as "functions".

One category of analysis performed on executable programs is "instrumentation". Instrumentation is generally used to gather runtime characteristics of a program. For example, the number of times that a function is executed while the application is executing is determined through instrumentation. While the information gathered through instrumentation may be extremely useful for purposes of enhancing program performance, the process of setting up a program for instrumentation can be time-consuming and very complicated.

Some dynamic instrumentation tools relocate instrumented functions during execution of the program into a new address space, such as shared memory address space, on the stack of a target program, on the heap of a target program or other similar methods. These different methods are referenced in this description under the term "shared memory". The shared memory space is allocated by the instrumentation tool and shared by the instrumentation tool and the executable program. The instrumented functions in the shared memory space are executed in lieu of the un-instrumented versions of the functions in the original address space. Some instrumented functions in the shared memory space may call other instrumented functions in the shared memory space, depending on the application.

In certain situations the call graph (or the "call chain") of a program must be traversed. The call graph refers to the order in which functions of the program are called and which of the functions are the calling and called functions. Traversal of the call graph is often referred to as "stack unwinding". Stack unwinding allows identification of calling and called functions. For example, if foo1( ) calls foo2( ), foo2( ) calls foo3( ), and foo3( ) calls foo4( ), stack unwinding from a location in foo4( ) allows identification of the chain of functions that were called in getting to the location in foo4( ). Functions in the call graph can be functions that have not been instrumented ("non-instrumented functions") or relocated instrumented functions.

An example situation in which stack unwinding is performed is when a program error occurs and a programmer is interested the function calling sequence relative to the location in the program at which the error occurred. This is sometimes referred to as a stack trace. Another example is where a C++ exception is "thrown" in a C++ program. The C++ runtime mechanism unwinds the stack upwards until it finds a matching "catch clause" (C++ terminology).

In some architectures, stack unwinding can be trivial. For example, where a single format is used for stack frames, traversing the call graph is easily achieved by reading values from the stack of the application in a well-defined way. However, stack unwinding in other architectures is more complicated because stack frames can have different formats. For example, in the IA-64 processor architecture from Hewlett-Packard different formats of stack frames are used to optimize performance of a given code stream. Unwinding is performed by reading supplemental unwind information that describes the format and content of each individual stack frame.

In the HP-UX system from Hewlett-Packard, the dynamic loader maintains information that associates loaded modules and the locations of unwind information for the loaded modules. When unwinding is needed, for example, because a C++ exception has been thrown, a function of the dynamic loader is called by the unwinder (libunwind on HP-UX) to identify the unwind information of the load module and the function within which the exception was raised. If unwinding is requested in an instrumented function, e.g. a C++ exception is thrown in the instrumented function, the dynamic loader will be unable to provide a reference to the required unwind information because the dynamic loader maintains only the unwind information for the un-instrumented version of the function. Unwinding through instrumented functions would therefore fail.

A system and method that address the aforementioned problems, as well as other related problems, are therefore desirable.

SUMMARY OF THE INVENTION

The present invention provides various methods and apparatus for handling call stack unwinding when execution of an instrumented program is stopped in a first function of the instrumented program. When unwinding is initiated and a call to a second function of unwind software is made, the call to the second function is intercepted. The second function returns a reference to unwind information associated with the first function of the instrumented program. The unwind information includes references to locations of selected instructions in the function. If the first function of the instrumented program is instrumented with instrumentation code, then updated unwind information is created. The updated unwind information includes updated references to the locations of the selected instructions in the first function as offset by the instrumentation code. A reference to the updated unwind information is returned.

Various example embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which.

DETAILED DESCRIPTION

Figure 1:
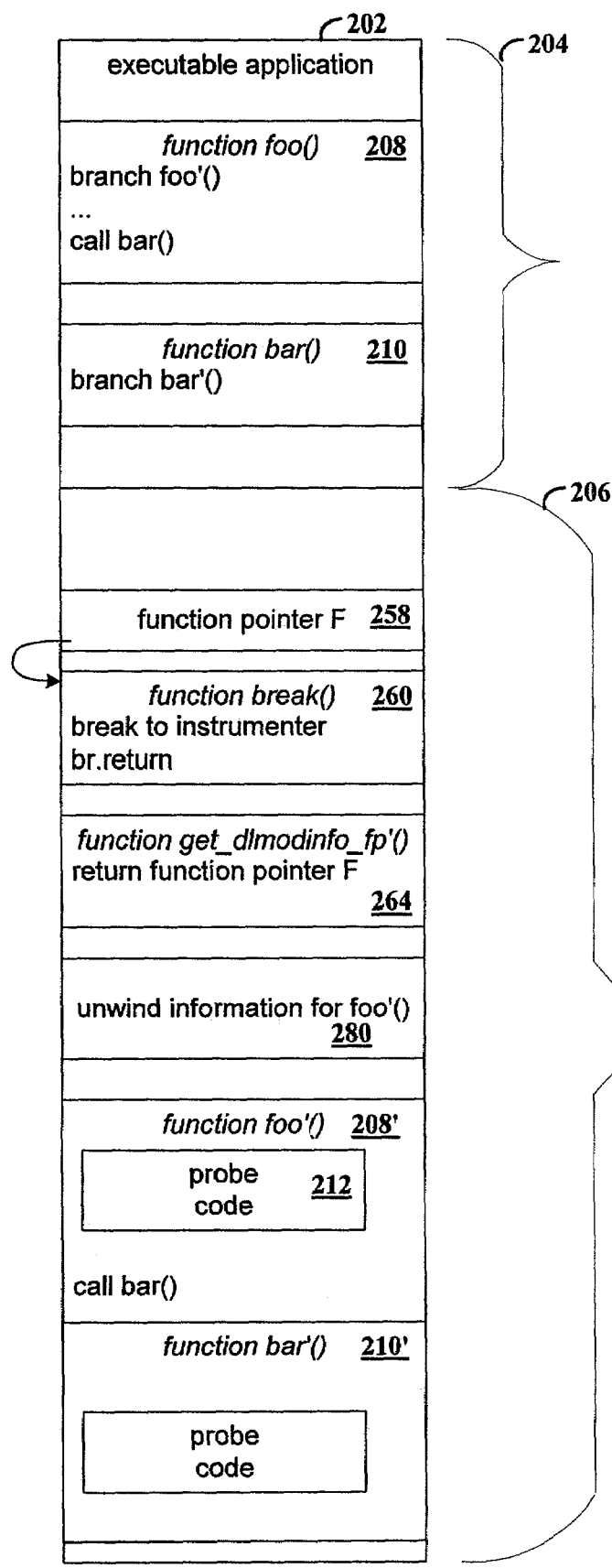
FIG. 1 is a block diagram of executable code in which instrumented versions of selected functions have been generated.

FIG. 1 is a block diagram of executable code in which instrumented versions of selected functions have been generated. The executable program 202 includes original address space 204 and shared address space 206, which is used for storage of relocated, instrumented functions. In one embodiment, the process for allocating and mapping shared memory is implemented consistent with the teachings of the patent application entitled, "DYNAMIC INSTRUMENTATION OF AN EXECUTABLE PROGRAM", by Hundt et al., filed on Apr. 11, 2001, and having patent/application Ser. No. 09/833,248, the contents of which are incorporated herein by reference.

Executable program 202 illustrates two functions, foo( ) 208 and bar( ) 210. Instrumented versions of foo( ) and bar( ) are created and are designated as foo'( ) 208' and bar'( ) 210' in shared address space 206. When an instrumented version of foo( ) is generated, probe code 212 is generated for foo'( ) in the shared address space 206. In addition, the first instruction of foo( ) 208 is replaced with an instruction to branch to foo'( ).

In an example system (HP-UX), a load-module descriptor structure is used to maintain pointers to unwind information for a loaded module. The dynamic loader software maintains this information on HP-UX. Each loaded module has a dedicated load-module descriptor structure. The unwinder software needs the unwind information in order to perform stack unwinding, and the current instruction pointer (IP) value is used to identify the proper load-module descriptor structure in the dynamic loader. Because each loaded module can be precisely correlated to an address range, the IP value will indicate the loaded module for a given function and the proper location of unwind information.

If unwinding is initiated when the IP value is in an instrumented function, however, the identity of the loaded module is not readily apparent because instrumented functions are in shared address space 206, which is not associated with any one particular loaded module. Thus, requesting from the dynamic loader the identity of a load module for an instrumented function will fail. In the HP-UX system, the dlmodinfo function within the dynamic loader is typically called to obtain the identity of the load module.

Figure 2:
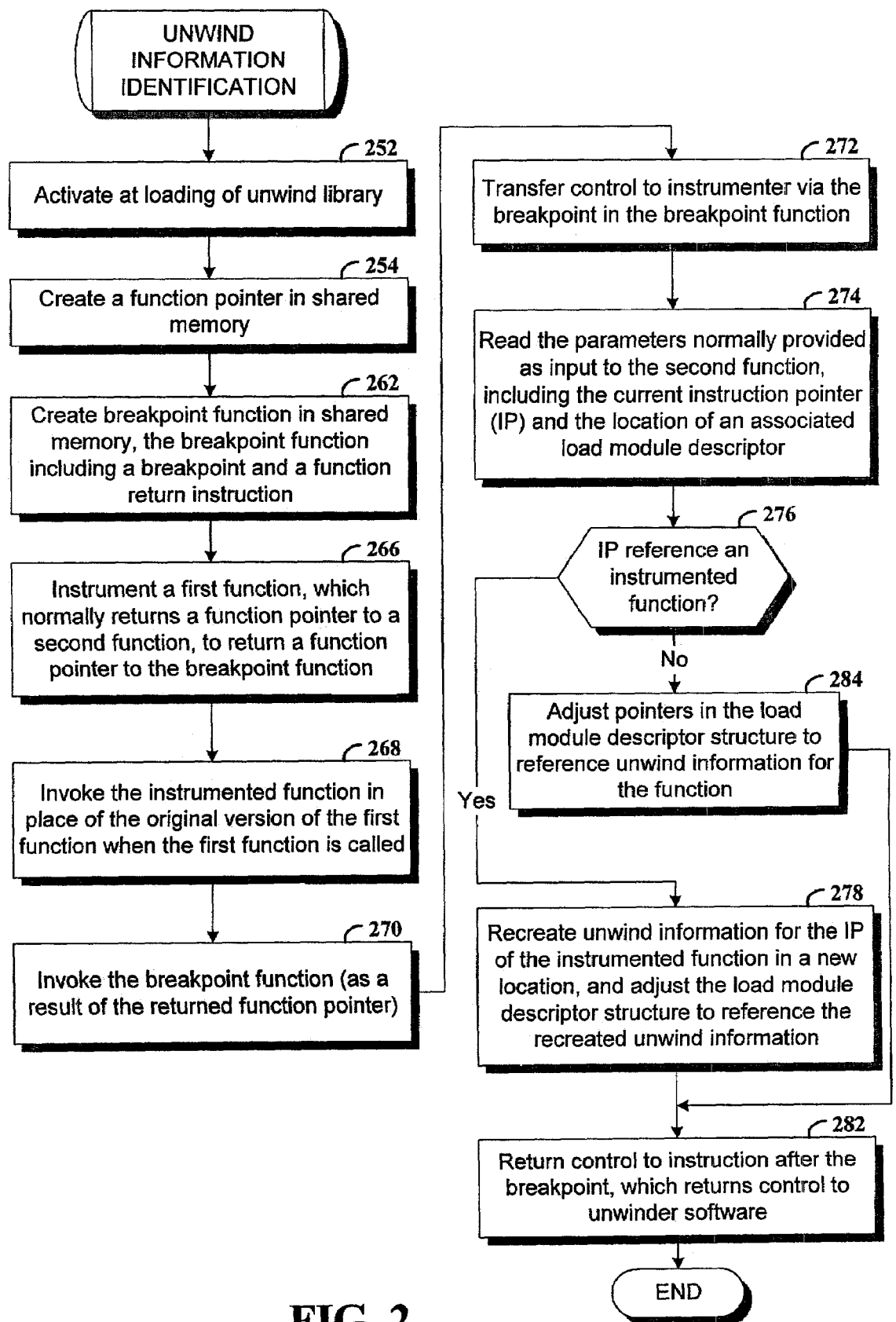
FIG. 2 is a flowchart of a process for identifying unwind information in accordance with one embodiment of the invention.

FIG. 2 is a flowchart of a process for identifying unwind information in accordance with one embodiment of the invention. A first part of the process is activated when the unwinder library is loaded (step 252). In one embodiment, the process for providing the appropriate unwind information for instrumented functions is implemented in an instrumenter program, such as the Caliper program from Hewlett-Packard. The instrumenter program attaches to the executable program, and the unwind library is loaded when the program is started. A function pointer 258 is created (step 254) in shared memory 206, along with a breakpoint function 260 (step 262). The function pointer references the breakpoint function, which includes a breakpoint that transfers control to the instrumenter program, followed by a return instruction.

The dynamic loader includes a function that provides access to the unwind information associated with the different loaded modules. The function is referred to herein as dlmodinfo( ). A function of the unwind library, get_dlmodinfo_fp( ), normally returns a pointer to dlmodinfo( ). The function pointer is then used by the unwind library in subsequent operations. In the example embodiment of the invention an instrumented get_dlmodinfo_fp'( ) 264 of get_dlmodinfo_fp( ) is created (step 266) to return a function pointer to the breakpoint function instead of a pointer to dlmodinfo( ). Thereafter in a second part of the process, each time unwinding is attempted, the breakpoint function is executed, which passes control to the instrumenter program. The instrumenter provides the necessary unwind information for instrumented functions.

The second part of the process begins at step 268 and is initiated when unwinding is attempted. The instrumented version (get_dlmodinfo_fp'( )) of get_dlmodinfo_fp( ) is invoked (step 268) and the function pointer to the breakpoint function is returned. Upon return of the function pointer, the breakpoint function is invoked (step 270). The executed breakpoint in the breakpoint function causes control to be transferred to the instrumenter (step 272).

The instrumenter reads the parameters that would normally be provided in the function call to dlmodinfo( ) (step 274). The parameters reference the load-module descriptor structure. In one example processor architecture the parameters that are normally provided by the unwinder software to the dlmodinfo( ) function, are read from registers. It will be appreciated that other processor architectures may specify different locations for parameters to functions. The parameters include the current value of the instruction pointer (IP) and the location of the load-module descriptor structure to be filled with load module information by dlmodinfo( ).

If the IP value references an instrumented function (decision step 276), the unwind information for the IP value is recreated in a new location (step 278), and the load module descriptor structure is updated to reference the new unwind information. Whether the IP value references an instrumented function is determined by comparing the IP value against the address ranges of load modules that have been loaded. In one embodiment, the dynamic loader maintains these address ranges. In one embodiment, the new unwind information (280) is stored in the shared memory that is accessible to the executable application and to the instrumenter. Control is then returned to the instruction following the breakpoint, which returns control to the unwinder software to continue with unwinding the stack (step 282).

It will be appreciated that if the instrumented function is relocated but has no added instrumentation code, the original unwind information within the load module address space is sufficient. An example embodiment addresses this case by updating the load module descriptor structure with a pointer to this unwind information instead of creating new unwind information.

Where an instrumented function includes probe code, however, the new unwind information must be created because the unwind information references particular instruction locations within the load module. If new unwind information is not created, the instruction locations would not be properly referenced. The following example illustrates unwind information containing references to instruction locations.

The unwind information for functions that exhibit a common code pattern is compacted into a few bits in the IA-64 architecture. An instruction location is encoded as a slot index, t, relative to the beginning of the the region of code, for example, the beginning of a function. The code below shows the first instructions of a function foo( ) in IA-64 assembly language.

```
foo::
    0000 alloc      r35 = ar.pfs, 0, 9, 2, 0
    0000 mov        r36 = rp
    0000 adds       r9 = 0, sp
    0010 addl       r39 = 0, r1;;
    0010 adds       sp = −32, sp
    0010 adds       r37 = −16, r9
    . . .
```

The corresponding decoded unwind information is shown below. The lines of unwind information are numbered, and the numbers are referenced in the description that follows.

```
1 R1prologue        rlen = 6
2 P7rp_when         t/spoff/pspoff = 1
3 P3rpgr            gr/br = 36
4 P7pfs_when        t/spoff/pspoff = 0
5 P3pfs_gr          gr/br = 35
...
```

Line 1 of the unwind information indicates to the unwind library that the code has a prologue region consisting of six instructions. Lines 2 and 3 indicate that the return pointer is saved to general register r36 in slot 1. Line 4 and 5 indicate that the ar.pfs register is saved to general register r35 in slot 0.

Thus, if as a result of instrumentation instructions are inserted at the beginning of foo( ), the slot indices in the unwind information will not match the instrumented code. The unwind information that is recreated at step 278 adjusts the slot indices and other values as needed to account for any code added during instrumentation.

If the IP value references a non-instrumented function, the pointers in the load module descriptor structure are updated to reference the unwind information for the non-instrumented function. Control is then returned to the instruction following the breakpoint, which returns control to the unwinder software (step 282).

In addition to the example embodiments described above, other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A computer-implemented method for handling call stack unwinding when execution of an instrumented program is stopped in a first function of the instrumented program, comprising:

attaching an instrumenter program to the instrumented program;

establishing a shared memory area for use by the instrumented program and the instrumenter program:

creating a breakpoint function that includes a breakpoint that transfers control to the instrumenter program;

intercepting a call to a second function of unwind software that returns a reference to unwind information associated with the first function of the instrumented program, the unwind information including references to locations of selected instructions in the function;

creating an instrumented version of a third function of the unwind software, wherein the instrumented version of the third function returns a function pointer to the breakpoint function instead of returning a function pointer to the second function;

if the first function of the instrumented program is instrumented with instrumentation code, then creating updated unwind information that includes updated references to the locations of the selected instructions in the first function as offset by the instrumentation code and returning a reference to the updated unwind information;

storing the undated unwind information in the shared memory area;

invoking the instrumented version of the third function when the unwinding is initiated; and executing the breakpoint function when the function pointer to the breakpoint function is returned from the instrumented version of the third function.

2. The method of claim 1, further comprising storing instrumented functions of the instrumented program in the shared memory area.

3. The method of claim 1, further comprising storing the breakpoint function and instrumented version of the third function in the shared memory area.

4. The method of claim 1, further comprising:

obtaining an instruction pointer value of the location in the first function of the instrumented program at which execution was stopped; and determining whether the first function of the instrumented program is instrumented by reference to whether the instruction pointer value is within address ranges of modules of the instrumented program.

5. The method of claim 1, further comprising creating the breakpoint function and the instrumented version of the third function upon loading the instrumented program.

6. An apparatus for handling call stack unwinding when execution of an instrumented program is stopped in a first function of the instrumented program, comprising:

means for attaching an instrumenter program to the instrumented program;

means for establishing a shared memory area for use by the instrumented program and the instrumenter program;

means for creating a breakpoint function that includes a breakpoint that transfers control to the instrumenter program;

means for intercepting a call to a second function of unwind software that returns a reference to unwind information associated with the first function of the instrumented program, the unwind information including references to locations of selected instructions in the function;

means for creating an instrumented version of a third function of the unwind software, wherein the instrumented version of the third function returns a function pointer to the breakpoint function instead of returning a function pointer to the second function;

means for creating updated unwind information that includes updated references to the locations of the selected instructions in the first function as offset by the instrumentation code and returning a reference to the updated unwind information, if the first function of the instrumented program is instrumented with instrumentation code;

means for storing the updated unwind information in the shared memory area;

means for invoking the instrumented version of the third function when the unwinding is initiated; and means for executing the breakpoint function when the function pointer to the breakpoint function is returned from the instrumented version of the third function.

* * * * *

UNITED STATES PATENT AND TRADEMARK OFFICE
CERTIFICATE OF CORRECTION

| | | |
|---|---|---|
| PATENT NO. | : 7,131,115 B2 | Page 1 of 1 |
| APPLICATION NO. | : 10/105765 | |
| DATED | : October 31, 2006 | |
| INVENTOR(S) | : Robert Hundt et al. | |

It is certified that error appears in the above-identified patent and that said Letters Patent is hereby corrected as shown below:

In column 5, line 47, in Claim 1, delete "program:" and insert -- program; --, therefor.

In column 6, line 1, in Claim 1, delete "undated" and insert -- updated --, therefor.

Signed and Sealed this

Sixteenth Day of June, 2009

JOHN DOLL
*Acting Director of the United States Patent and Trademark Office*